(12) United States Patent
Banko

(10) Patent No.: US 7,827,568 B1
(45) Date of Patent: Nov. 2, 2010

(54) INTEGRATION OF STRUCTURAL AND COSMETIC BEZEL HAVING A DISK GUIDE FOR A SLOT LOADING OPTICAL DRIVE

(75) Inventor: Joshua David Banko, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 10/798,476

(22) Filed: Mar. 10, 2004

(51) Int. Cl.
G11B 17/04 (2006.01)

(52) U.S. Cl. .................. 720/619; 720/622; 720/628; 720/646

(58) Field of Classification Search ......... 720/646–647, 720/619, 622, 628, 655
See application file for complete search history.

(56) References Cited

U.S. PATENT DOCUMENTS

| | | | | |
|---|---|---|---|---|
| 5,084,855 A * | 1/1992 | Kobayashi et al. | .......... | 720/647 |
| 5,510,957 A * | 4/1996 | Takagi | .......... | 361/814 |
| 5,701,216 A * | 12/1997 | Yamamoto et al. | ....... | 360/99.02 |
| 5,732,057 A * | 3/1998 | Okabe et al. | ........ | 720/647 |
| 5,748,595 A * | 5/1998 | Nakajima | ........ | 720/647 |
| 5,793,728 A * | 8/1998 | Selby et al. | ........ | 720/676 |
| 5,848,042 A * | 12/1998 | Takahashi et al. | ........ | 720/647 |
| 6,297,949 B1 * | 10/2001 | Nayak et al. | ........ | 361/684 |
| 6,411,583 B1 * | 6/2002 | Yamamoto et al. | ........ | 720/647 |
| 6,618,339 B2 * | 9/2003 | Sugita et al. | ........ | 720/647 |
| 6,910,217 B2 * | 6/2005 | Kan-o | ........ | 720/646 |
| 6,918,128 B2 * | 7/2005 | Hasegawa et al. | ........ | 720/647 |
| 6,931,649 B2 * | 8/2005 | Sugita et al. | ........ | 720/647 |
| 2004/0042623 A1 * | 3/2004 | Zapalski et al. | ........ | 381/86 |

* cited by examiner

Primary Examiner—William J Klimowicz
Assistant Examiner—Carlos E Garcia
(74) Attorney, Agent, or Firm—Blakely, Sokoloff, Taylor & Zafman LLP

(57) ABSTRACT

An optical drive bezel assembly for coupling to an optical drive. The optical drive bezel assembly includes a functional bezel having a first opening to receive an optical disk and a first plurality of attachment features. The functional bezel is coupled to the optical drive. A disk guide is rigidly coupled to the functional bezel. A cosmetic bezel has a second opening to receive the optical disk and a second plurality of attachment features. The cosmetic bezel is rigidly coupled to the functional bezel. A cosmetic screen is attached to the cosmetic bezel. The first opening and the second opening are in alignment.

31 Claims, 7 Drawing Sheets

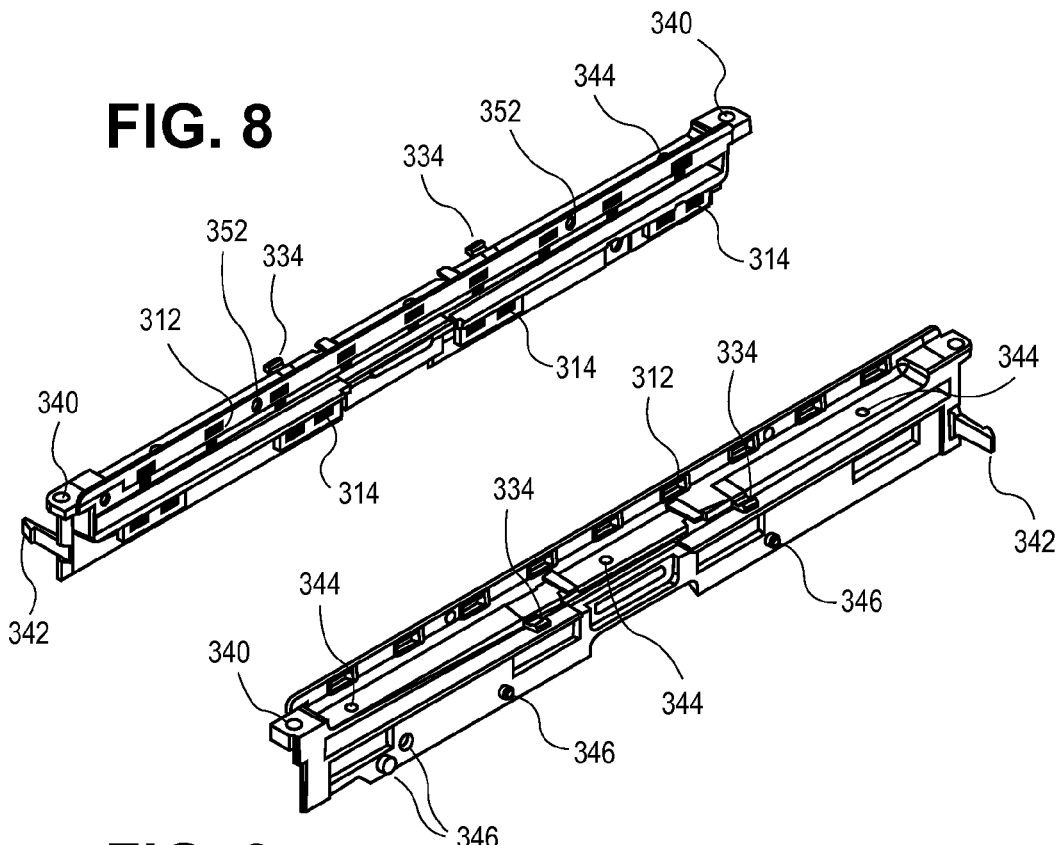
FIG. 8
FIG. 9
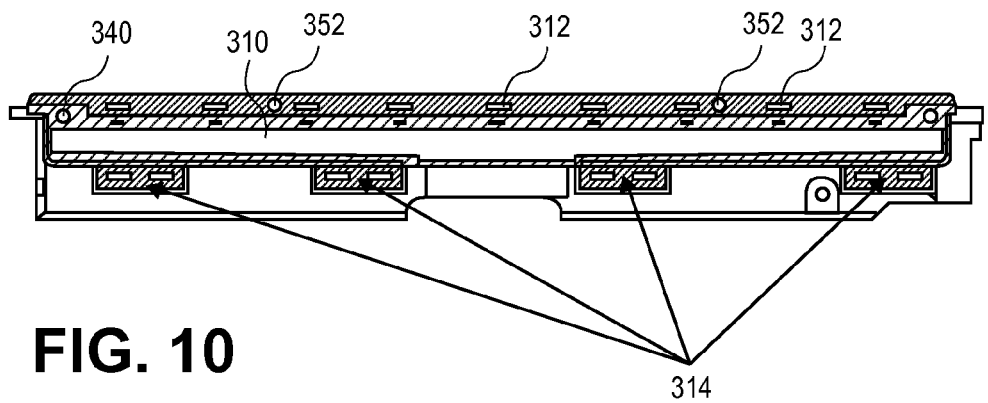
FIG. 10

INTEGRATION OF STRUCTURAL AND COSMETIC BEZEL HAVING A DISK GUIDE FOR A SLOT LOADING OPTICAL DRIVE

BACKGROUND

Aspects of the present invention include an optical drive bezel for an optical disk drive that includes integration of structural and cosmetic bezels for a slot loading optical drive.

A personal computer system may be thought of as a general-purpose, single-user microcomputer that is designed to be operated by a person. A small and low cost personal computer (PC) may include a monitor connected to a computer, each of which may receive power from an ordinary outlet. In operation, the monitor accepts video signals from a graphic card within the computer over a cable assembly and displays this information on a screen.

A computer system may include at least one optical disk drive configured to receive an optical disk such as a DVD or a CD disk for data processing. The optical disk drive is coupled to the motherboard of the computer system as is well known in the art. The optical disk drive is mounted in the computer system via a chassis that has an enclosure case. FIG. 1 shows a conventional way of mounting a slot loading optical disk drive 102 in a chassis 104 of a computer system (partially shown). The chassis 104 includes an enclosure 106 and a cosmetic piece 108 affixed to the enclosure 106. The cosmetic piece 108 includes a slot 110 to receive an optical disk 112. The optical disk 112 can be loaded into the optical drive 102 as is known in the art. The cosmetic piece 108 is not fixed to the optical drive 102 and there is no mechanical fastener directly between the cosmetic piece 108 and the optical drive 102. Thus, the cosmetic piece 108 can be decoupled or misaligned with the face of the optical drive 102. The decoupling or misalignment possibility can cause reliability problems when inserting and/or ejecting the optical disk 112. For example, the optical disk 112 can be easily damaged during ejection or injection. Additionally, the optical disk 112 can be jammed during ejection or injection due to the misalignment thus causing installation failure.

FIG. 2 shows another conventional way of mounting a slot loading optical disk drive 102 in a chassis 104 of a computer system (not shown). The chassis 104 includes an enclosure 107 which also functions as a cosmetic piece. The enclosure 107 includes a slot 110 to receive an optical disk 112. The optical disk 112 can be loaded into the optical drive 102 as is known in the art. The enclosure 107 is not fixed to the optical drive 102 and there is no mechanical fastener directly connecting the enclosure 107 and the optical drive 102. A functional structure 111 having a slot 113 is coupled to the optical drive 102. The functional structure 111 provides some alignment mechanism for the optical disk 112 during injection and ejection. Misalignment of the slot 113 with the slot 110 is still a possibility depending on how the functional structure 111 is mounted in the chassis 104. The misalignment possibility can cause reliability problems when inserting and/or ejecting the optical disk 112.

SUMMARY OF THE INVENTION

An optical drive bezel assembly for coupling to an optical drive. The optical drive bezel assembly includes a functional bezel having a first opening to receive an optical disk and a first plurality of attachment features. The functional bezel is coupled to the optical drive. A disk guide is rigidly coupled to the functional bezel. A cosmetic bezel has a second opening to receive the optical disk and a second plurality of attachment features. The cosmetic bezel is rigidly coupled to the functional bezel. A cosmetic screen is attached to the cosmetic bezel. The first opening and the second opening are in alignment.

In another embodiment, an optical disk drive assembly comprises an optical disk drive coupling to an optical drive bezel assembly, the optical drive bezel having a functional bezel rigidly attached to a cosmetic bezel, and a cosmetic screen disposed between the functional bezel and the cosmetic screen and fixedly attached to the cosmetic bezel, wherein a slot is provided in the optical drive bezel to allow an optical disk to pass therethrough.

In another embodiment, a computer system comprises a chassis or enclosure housing a computer system which has an optical drive. The optical drive is attached to the chassis or enclosure. A functional bezel having a first opening to receive an optical disk and a first plurality of attachment features is coupled to the optical drive and the chassis or enclosure. A disk guide is rigidly coupled to the functional bezel. A cosmetic bezel has a second opening to receive the optical disk and a second plurality of attachment features and is rigidly coupled to the functional bezel. A cosmetic screen is attached to the cosmetic bezel. The first opening and the second opening are in alignment.

BRIEF DESCRIPTION OF DRAWINGS

FIGS. 8-10 illustrate three different views of a functional bezel of an optical drive bezel.

DETAILED DESCRIPTION OF THE INVENTION

Figure 1:
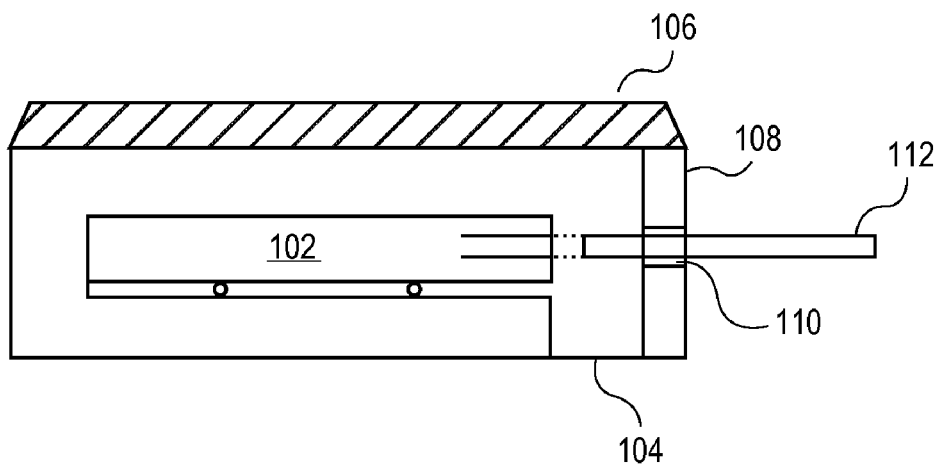
FIG. 1 illustrates a conventional way of mounting a slot loading optical disk drive in a computer system.
Figure 2:
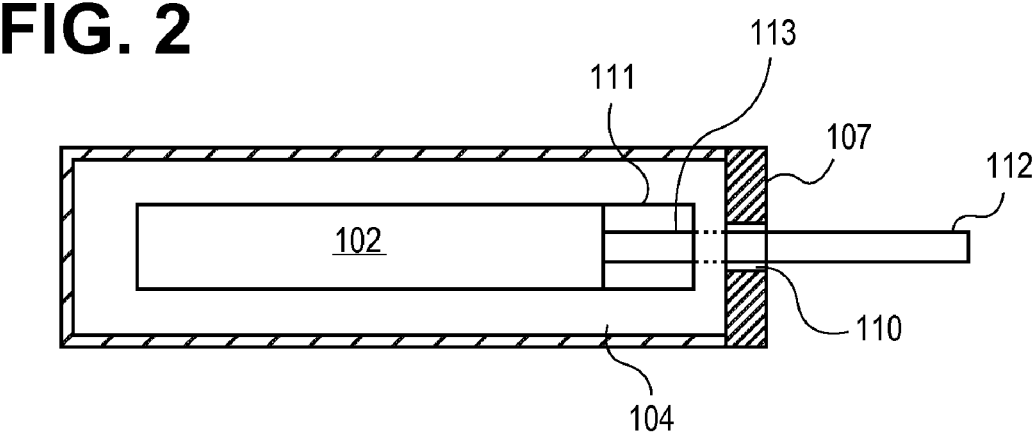
FIG. 2 illustrates another conventional way of mounting a slot loading optical disk drive in a computer system.
Figure 3:
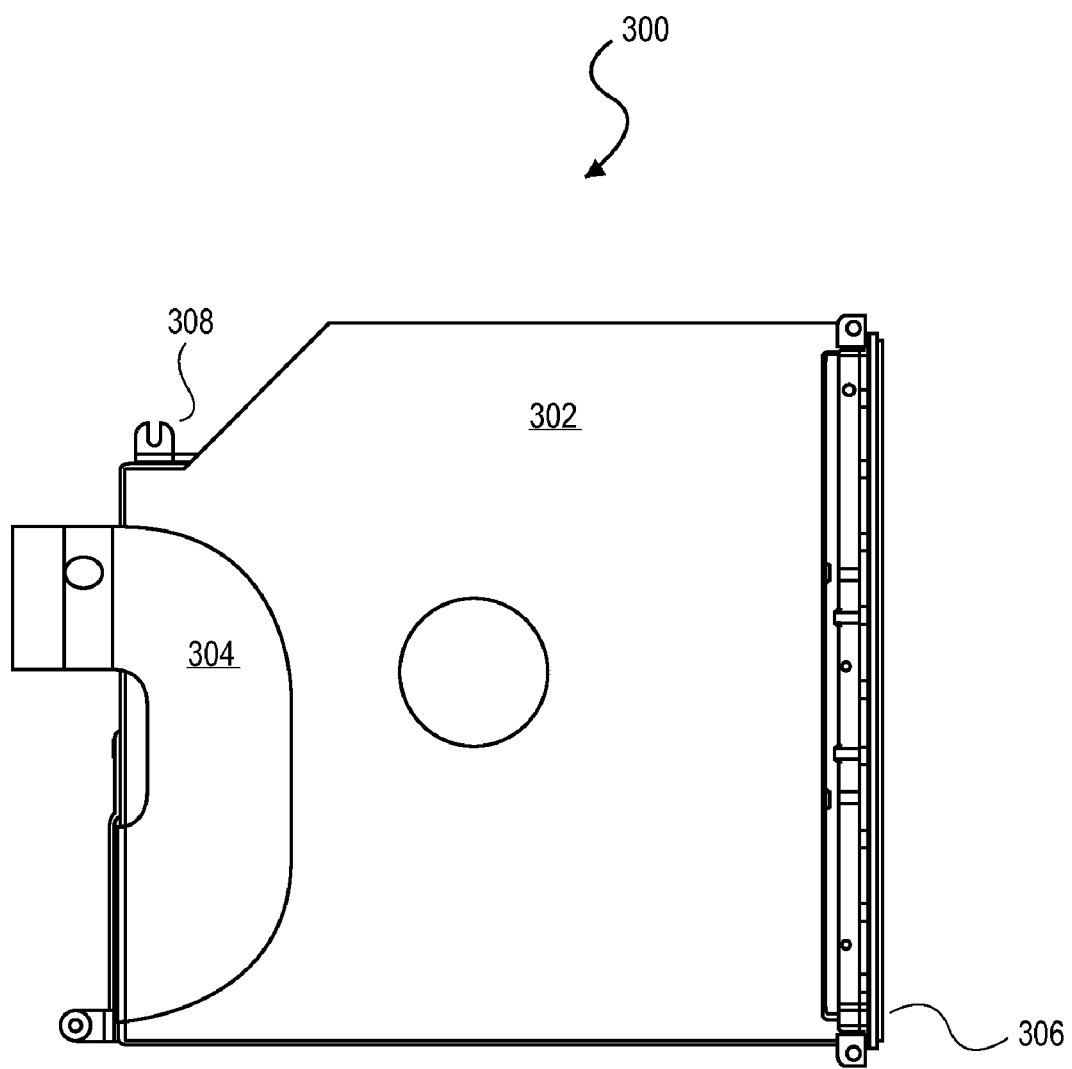
FIG. 3 illustrates an exemplary optical disk drive assembly with an optical drive bezel in accordance to embodiments of the present invention.

FIG. 3 illustrates an exemplary embodiment of an optical disk drive assembly 300. The optical disk drive 300 includes an optical disk drive 302 which is coupled to an optical drive bezel assembly 306. Embodiments of the present invention pertain to the configuration and integration of various parts of the optical drive bezel assembly 306. In one embodiment, the optical disk drive 302 is a slot loading optical disk that can accommodate at least one of a CD or a DVD disk. The optical disk drive 302 is also coupled to an electrical interconnect 304. In one embodiment, the electrical interconnect 304 is a flexible cable that provides an electrical interface of the optical disk drive to the motherboard of a computer system. The optical drive bezel assembly 306 includes a functional bezel rigidly attached to a cosmetic bezel, and a cosmetic screen disposed between the functional bezel and the cosmetic screen and fixedly attached to the cosmetic bezel (see below). A slot (not shown here) is provided in the optical drive bezel assembly 306 to allow an optical disk to pass therethrough. The optical disk drive 302 is further coupled to a chassis bracket 308 to allow the optical disk drive 302 to mount to a chassis or enclosure. The chassis bracket 308 may also be mounted to the optical drive bezel assembly 306. The optical drive bezel assembly 306 thus can also provide a structural rigidity for the optical disk drive 302.

Figure 4:
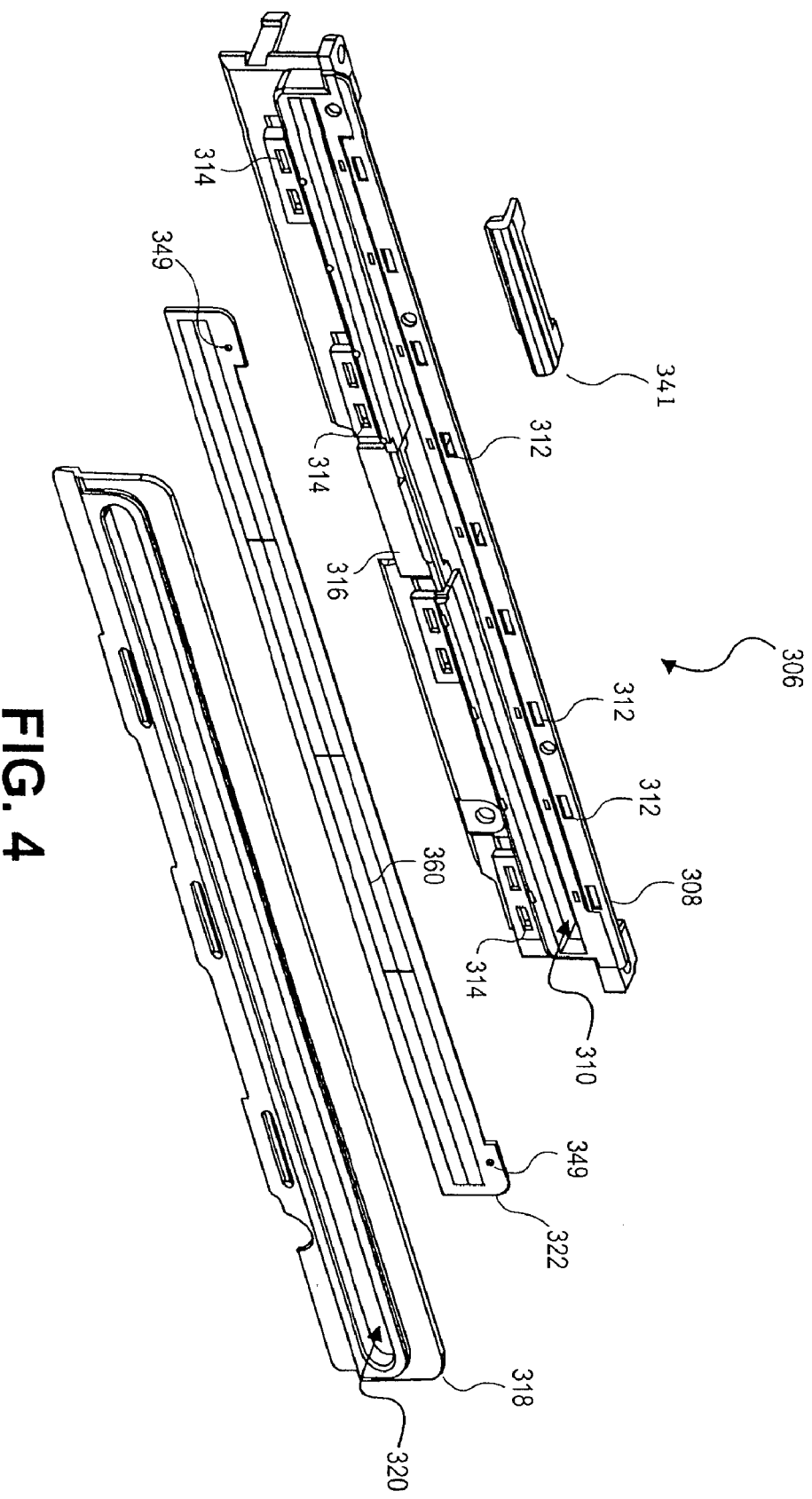
FIG. 4 illustrates a detail view of an exemplary optical drive bezel.

FIG. 4 illustrates an exemplary embodiment of the optical drive bezel assembly 306. One feature of the optical drive bezel assembly 306 is that all parts of the optical drive bezel assembly 306 are integrated as one unit before being attached to the optical disk drive 302. Misalignment is thus minimized or eliminated. The optical drive bezel assembly 306 includes a functional bezel 308 having a first opening 310 to receive an optical disk (not shown) and a first plurality of attachment features 312 and 314. The attachment features 312 are for attachment to the top side of the functional bezel 308 and the attachment features 314 are for attachment to the bottom side of the functional bezel 308. The optical drive bezel assembly 306 also includes a disk guide 341 rigidly coupled to the functional bezel 308. The disk guide 341 is clipped onto section 316 of the functional bezel 308 which is approximately the middle section of the functional bezel 308. The optical drive bezel assembly 306 also includes a cosmetic bezel 318 having a second opening 320 to receive the optical disk. The optical drive bezel assembly 306 includes a second plurality of attachment features (not shown in this view). The cosmetic bezel 318 is rigidly coupled to the functional bezel 308 through the attachment features. The first plurality of attachment features 312 and 314 are thus complimentary to the second plurality of attachment features. The optical drive bezel assembly 306 also includes a cosmetic screen 322 disposed between the functional bezel 308 and the cosmetic bezel 318. The cosmetic screen 322 is fixedly attached to the cosmetic bezel 318. The functional bezel 308, the cosmetic bezel 318, and the cosmetic screen 322 are rigidly attached to each other such that the first opening 310 and the second opening 320 are in alignment.

Figure 5:
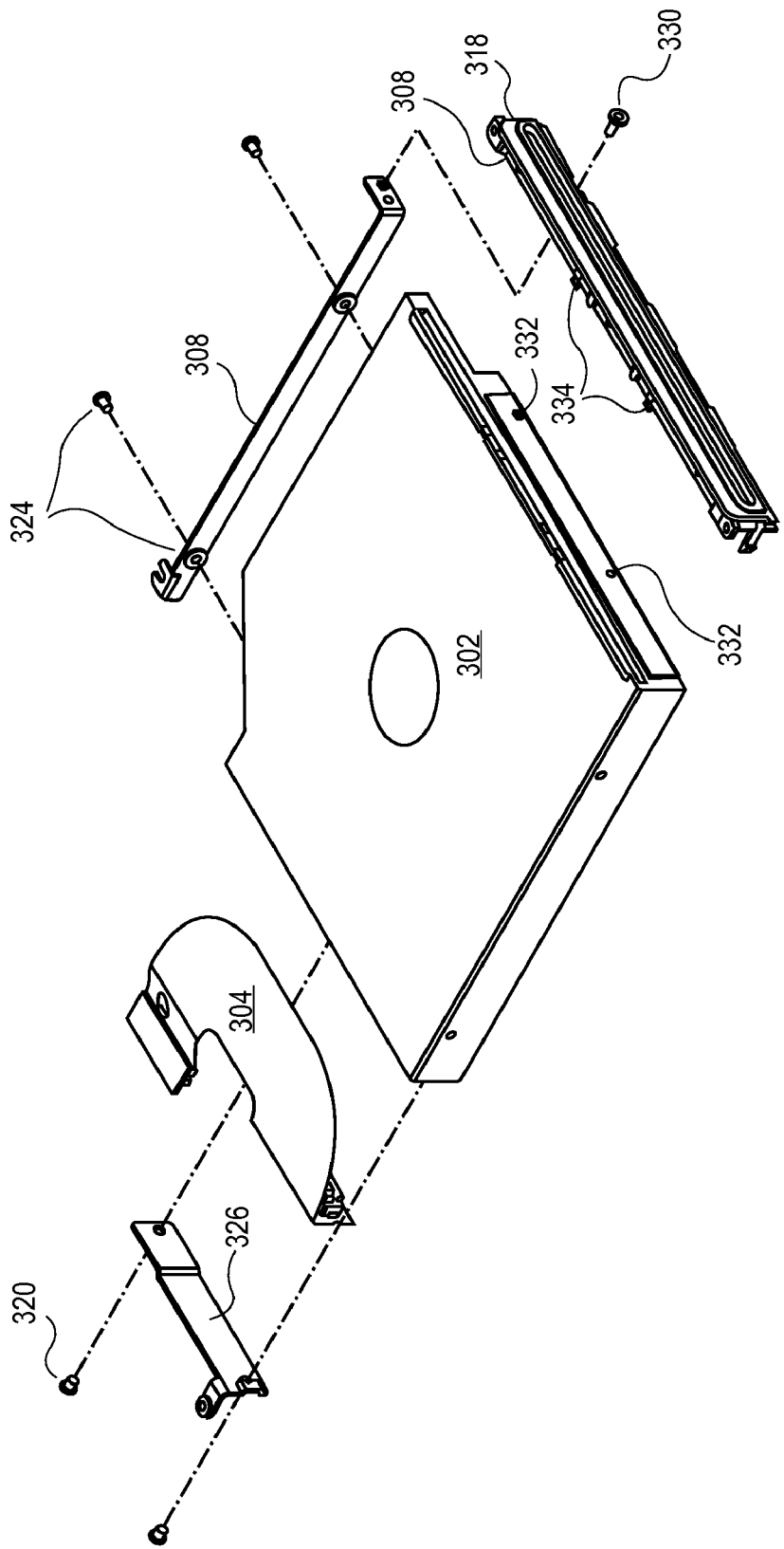
FIG. 5 illustrates an exemplary embodiment of assembling the optical drive bezel to an optical drive.

FIG. 5 illustrates an exemplary embodiment of the optical drive bezel assembly 306 being coupled to the optical drive 302 and how these units can be attached to a chassis or enclosure of a computer system. The optical drive 302 is shown to be attached to the chassis bracket 308 which is attached to a chassis or enclosure (not shown) that houses the optical drive 302. The chassis bracket 308 includes a plurality of mounting mechanisms 324 which can be nuts and screws as is know in the art. The mounting mechanisms 324 allows for the mounting of the optical drive 302 to the chassis or enclosure. Normally, the optical drive is not easily removable by a user. In other words, the optical drive is normally fixed in placed and is not designed to be removed by a simple sliding in/out procedure which is available on certain types of laptop computers (e.g., IBM's Thinkpads have "Ultrabays" which allow for easy inserting or removal of optical drives). The optical drive 302 is also shown to be attached to the electrical interconnect 304 and a back chassis bracket 326 through another set of mounting mechanism 328 (e.g., nuts and for screws). The optical drive bezel assembly 306 is attached to the chassis bracket 308 through a mounting mechanism 330. The optical drive bezel assembly 306 is attached to the optical drive 302 via a plurality of mounting points 334 provided on the optical drive bezel assembly 306 which are configured to be in alignment with a plurality of mounting points 332 on the optical drive 302.

In one embodiment, the functional bezel 308 provides a structural rigidity of the slot loading optical drive 302. The slot loading optical drive 302 can be one in a desktop format kind of computer or a portable computer (laptop or notebook computer). Such computer system includes a chassis or enclosure that houses the computer system's motherboard and the optical drive 302 and the functional bezel 308 are mounted to chassis or enclosure. In addition, the functional bezel 308 also provides structural mounting points for the optical drive 302 to attach to the internal chassis or enclosure of the computer system. Additionally, the functional bezel 308 also provides attachment locations for the cosmetic bezel 318 as previously described.

Figure 6:
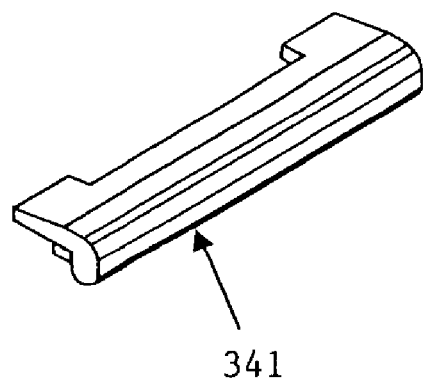
FIGS. 6-7 illustrate an exemplary disk guide used with an optical drive.
Figure 7:
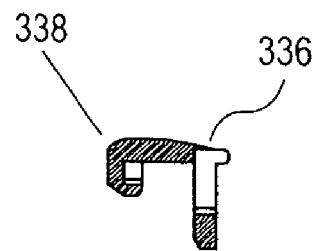

In one embodiment, to prevent an optical disk from being scratched, jammed, or misaligned during injection or ejection, the disk guide 341 is installed on the functional bezel 308. In one embodiment the disk guide 341 is clipped onto the middle section 316 of the functional bezel 308. In one embodiment, the disk guide 341 is made of a lubricious plastic. The disk guide 341 also prevents the optical disk from getting stuck on the functional bezel 308 during ejection or on the cosmetic bezel 318 during injection. The disk guide 341 is configured so that it is tapered as shown in FIGS. 6-7. FIG. 6 illustrates a three dimensional view of the disk guide 341 and FIG. 7 illustrates a cross-sectional view of the disk guide 341. The disk guide 341 is tapered to ramp down toward the side 336 which will be the side that faces the optical drive 302 and to ramp up toward the external side 338 which will be the side that faces the cosmetic bezel 318. When an optical disk is inserted into the optical drive 302 through the optical drive bezel assembly 306, the optical disk is guided slightly downward toward the optical drive 302. The disk guide 341 thus guides the optical disk in a proper alignment into the optical drive 302. The optical disk is guided so that it is injected into the optical drive 302 below the top surface of the opening in the optical drive bezel assembly 306 and straight into the optical drive 302. This way, jamming or scratching the optical disk during injection is minimized. The angle of the ramp down is configured so that the disk will be guided in a proper alignment into the optical drive 302.

When an optical disk is ejected from the optical drive 302 through the optical drive bezel assembly 306, the optical disk is guided slightly upward toward the opening 330 cosmetic bezel 318. The optical disk is guided so that it is ejected from the optical drive 302 above the bottom surface of the opening in the optical drive bezel assembly 306 and straight out of the optical drive 302. This way, jamming or scratching the optical disk during ejection is minimized. The angle of the ramp up is configured so that the disk will be guided out of the opening in the optical drive bezel 306 without jamming against the optical drive bezel assembly 306. In one embodiment, the ramp up may have an angle of approximately 8.5 degrees.

Returning to FIGS. 8-10 illustrate the functional bezel 308 in more details the features that allow the functional bezel 308 to be rigidly attached to the cosmetic bezel 318 and the optical drive 302. FIGS. 8-10 illustrate the functional bezel 308 in three different views, two different back views of the functional bezel 308 and a front view of the functional bezel 308.

FIGS. 8 and 10 illustrate the front view of the functional bezel 308 showing two mounting holes 340 for mounting the functional bezel 308 to a computer system's chassis or enclosure. The functional bezel 308 may also include a plurality of threaded holes 344 which are used for mounting the functional bezel 308 to the chassis or enclosure. The functional bezel 308 may also include a tab 342 that can engage a slot provided on the optical drive 302 to provide additional fixture or attachment points. Also, the functional bezel 308 includes the mounting points 334, which could be tabs, created on the functional bezel 308. The mounting points 334 can engage or hook into the mounting points 361, which could be slots provided on the optical drive 302 (FIG. 5) to allow the functional bezel 308 to be attached to the optical drive.

FIG. 9 illustrates a plurality of alignment features such as attachment features 312, 314, and 346. The attachment features are located on the functional bezel 308 in accordance with the configuration and/or design of the cosmetic bezel 318. The attachment features are also alignment features that help align the functional bezel 308 and the cosmetic bezel 318 together properly for optimal attachment and integration. In one embodiment, the plurality of attachment features 312 provided on the functional bezel 308 are heat stake wells to allow the functional bezel 308 to be (adhered to mended via heat) to complimentary heat stake posts on the cosmetic bezel 318 (see below). The attachment features 312 provide top attachment points for the functional bezel 308 to the cosmetic bezel 318. It is to be appreciated that other attachment techniques can be used such as welding, using adhesive, and other mechanical attachment techniques. In one embodiment, the plurality of attachment features 314 provided on the functional bezel 308 are also heat stake wells to allow the functional bezel 308 to be adhered or mended via heat to complimentary heat stake posts on the cosmetic bezel 318. The attachment features 314 provide bottom attachment points for the functional bezel 308 to the cosmetic bezel 318. Additionally, the attachment features 346 on the functional bezel attach to recesses or mounting points 332 in the optical drive 302.

Figure 11:
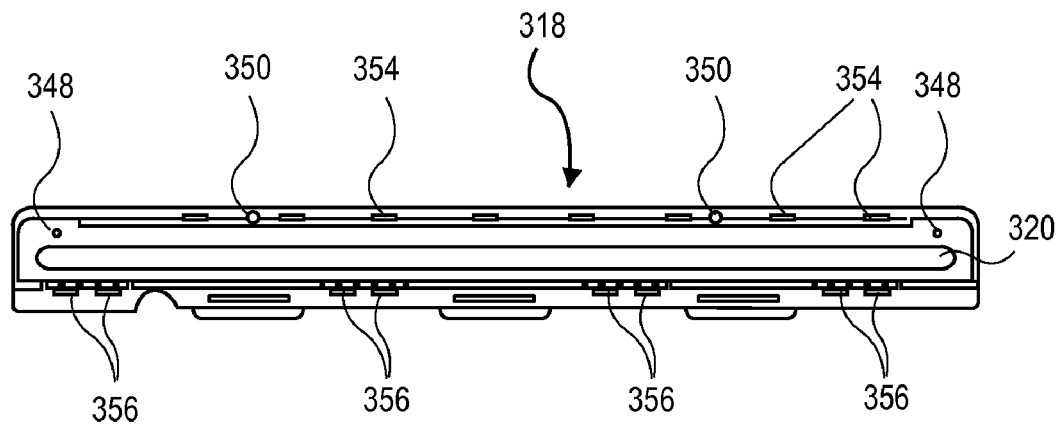
FIGS. 11-12 illustrate two different views of a cosmetic bezel of an optical drive bezel.
Figure 12:
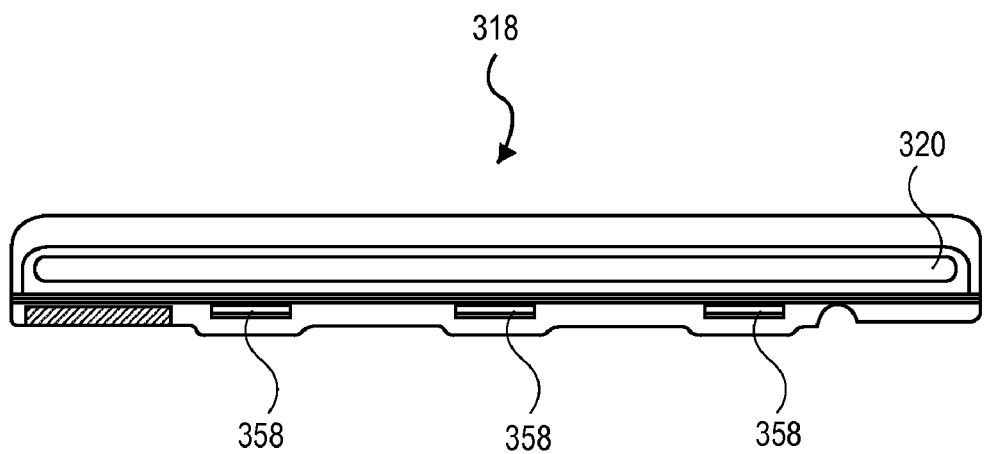

FIG. 11 illustrates the back view of the cosmetic bezel 318 and FIG. 12 illustrates the front view of the cosmetic bezel 318. From the back view, it can be seen that the cosmetic bezel 318 includes alignment features 350 which align with alignment features 352 provided on the functional bezel 308 (FIGS. 8 and 10). Additionally, the cosmetic bezel 318 also includes a plurality of attachment features 354, which in one embodiment are heat stake posts created on the cosmetic bezel 318. The attachment features 354 are complimentary to the attachment features 312. The attachment features 354 are positioned on the topside of the cosmetic bezel 318. In the embodiment where the attachment features 354 are heat stake posts and the attachment features 312 (on the functional bezel 308) are heat stake wells, the functional bezel 308 and the cosmetic bezel 318 are adhered to each other when heat is applied to the attachment features. The cosmetic bezel 318 also includes a plurality of attachment features 356 positioned at the bottom side of the cosmetic bezel 318. The attachment features 356 are complimentary to the attachment features 314 on the functional bezel 308. In the embodiment where the attachment features 356 are heat stake posts and the attachment features 314 are heat stake wells, the functional bezel 308 and the cosmetic features 318 are adhered to each other when heat is applied to the attachment features. It is to be appreciated that other techniques to attach the functional bezel 308 to the cosmetic bezel 318 can be used instead of heat staking. It is also to be anticipated that either the attachment features on the functional bezel 308 or the attachment features on the cosmetic bezel 318 can be the heat stake wells or the heat stake posts.

In one embodiment, the cosmetic bezel 318 also includes a plurality of mounting points 358 to mount the cosmetic bezel 318 to the chassis or enclosure of the computer system.

In one embodiment, the cosmetic bezel 318 includes a recess (not shown) for the cosmetic screen 322 to be attached thereto. The cosmetic screen 322 can be positioned in the recess and attached in a way that it is flushed against the cosmetic bezel 318. The cosmetic bezel 318 also includes alignment points 348 for alignment the cosmetic screen 322 with the cosmetic bezel 318. The cosmetic screen 322 includes alignment points 349 (FIG. 4) which are to be aligned with alignment points 348 on the cosmetic bezel 318 for a proper attachment of the cosmetic screen 322 to the cosmetic bezel 318. The cosmetic screen 322 can be attached to the cosmetic bezel using adhesive, heat staking, or other suitable mechanical bonding techniques.

In one embodiment, the cosmetic screen 322 functions to prevent contaminants such as dust, particles, or the like to get into the optical drive 302. The cosmetic screen 322 also wipes the optical disk prior to or as it is being injected into the optical drive 302. The cosmetic screen may also provide EMF (Electromagnetic Field) shielding to prevent RF (Radio Frequency) energy which is generated within the chassis to leak outside of the chassis. The cosmetic screen 322 can be adjusted in thickness to control, for example, the contact friction induced on the optical disk during ejection, effectively controlling the ejection speed of the optical disk. In one embodiment, the cosmetic screen 322 is a composite of chamois adhesive and a polymer film such as Mylar (Mylar is a Trademark of Dupont). The Mylar is installed on the cosmetic screen 322 to help the installation of the cosmetic screen 322 onto the cosmetic bezel 318. The Mylar can provide some rigidity to the cosmetic screen 322 because without the Mylar, the cosmetic screen 322 is flimsy making it difficult to be properly aligned on the cosmetic bezel 318 for attachment. In one embodiment, the cosmetic screen 322 includes a slit 360 to allow the optical disk to be injected and ejected therethrough. The slit 360 is in alignment with the opening 310 of the functional bezel 308 and the opening 320 of the cosmetic bezel 318 to allow an optical dish to pass through. Incorporating the Mylar also helps keeping the slit 360 in the cosmetic screen 322 from becoming wavy when it is being installed onto the cosmetic bezel 318. The cosmetic screen 322 can be made to match the aesthetic quality of the computer system chassis or enclosure.

In one embodiment, the opening 320 in the cosmetic bezel 318 is larger than the opening 310 in the functional bezel 308 to facility injection or ejection or the alignment of the optical disk into and out of the optical drive 302.

The exemplary embodiments described herein are provided merely to illustrate the principles of the invention and should not be construed as limiting the scope of the subject matter of the terms of the claimed invention. The specification and drawings are, accordingly, to be regarded in an illustrative rather than a restrictive sense. Moreover, the principles of the invention may be applied to achieve the advantages described herein and to achieve other advantages or to satisfy other objectives, as well.

I claim:

1. An apparatus comprising:
   a functional bezel having a first opening to receive an optical disk and a first plurality of attachment features;
   a cosmetic bezel having a second opening to receive the optical disk and second plurality of attachment features wherein the first opening and the second opening are in alignment;
   a disk guide wherein the disk guide includes a ramp feature forming a lower surface of an opening having a ramp up toward an external side to point the optical disk downward into an optical drive during injection and to point the optical disk upward during ejection; and
   a cosmetic screen disposed adjacent to the functional bezel and the cosmetic bezel and fixedly attached to one of the functional bezel and the cosmetic bezel,
   wherein the functional bezel and the cosmetic bezel are attached to form an integrated optical drive bezel, the integrated optical drive bezel configured to be coupled to the optical drive after the functional bezel and the cosmetic bezel are attached to form the integrated optical drive bezel, and wherein the integrated optical drive bezel is configured such that removal of the cosmetic bezel will also remove the functional bezel which is attached to the cosmetic bezel.

2. The apparatus of claim 1 wherein the functional bezel provides structural rigidity for the optical drive.

3. The apparatus of claim 1 wherein the functional bezel includes a plurality of mounting points for mounting the functional bezel to the optical drive and for mounting the functional bezel to an enclosure that houses the optical drive.

4. The apparatus of claim 1 wherein the functional bezel includes a plurality of mounting points for mounting the functional bezel to various configurations of various optical drives.

5. The apparatus of claim 1 wherein the first plurality of attachment features of the functional bezel matches the second plurality of attachment features.

6. The apparatus of claim 1 further comprising wherein the disk guide facilitates proper attachment of the optical disk into the optical drive.

7. The apparatus of claim 1 wherein the ramp feature is rigidly coupled to the functional bezel and wherein the ramp feature points the optical disk down into the optical drive during injection and points the optical disk up during ejection and wherein the cosmetic screen is disposed between the functional bezel and the cosmetic bezel.

8. The apparatus of claim 1 wherein the cosmetic bezel includes a recess configured to receive the cosmetic screen.

9. The apparatus of claim 1 wherein the second opening in the cosmetic bezel is larger than the first opening in the functional bezel to facilitate injection or ejection.

10. The apparatus of claim 1 wherein the cosmetic screen performs at least one of minimizing contaminants into the optical disk drive and wiping the optical disk as the optical disk is being inserted into the optical drive.

11. An optical disk drive assembly comprising:
an optical disk drive;
an optical drive bezel having a functional bezel rigidly attached to a cosmetic bezel, a disk guide including a ramp feature forming a lower surface of an opening having a ramp up toward an external side to point the optical disk downward into the optical drive during injection and to point the optical disk upward during ejection, and a cosmetic screen disposed adjacent to the functional bezel and the cosmetic bezel, wherein a slot is provided in the optical drive bezel assembly to allow an optical disk to pass therethrough and wherein the slot remains open when a disk is in the optical drive, wherein the optical drive bezel assembly is coupled to the optical disk drive after the functional bezel is rigidly attached to the cosmetic bezel, and wherein the integrated optical drive bezel is configured such that the removal of the cosmetic bezel will also remove the functional bezel which is attached to the cosmetic bezel.

12. The optical disk drive assembly of claim 11 wherein the functional bezel has a first opening to receive the optical disk and a first plurality of attachment features, the functional bezel coupled to the optical drive, and the cosmetic bezel has a second opening to receive the optical disk and second plurality of attachment features, wherein the first opening and the second opening are in attachment to form the slot.

13. The optical disk drive assembly of claim 11 wherein the functional bezel provides structural rigidity for the optical disk drive.

14. The optical disk drive assembly of claim 11 wherein the functional bezel includes a plurality of mounting points for mounting the functional bezel to the optical disk drive.

15. The optical disk drive assembly of claim 11 wherein the functional bezel includes a plurality of mounting points configured for mounting the functional bezel to the slot loading optical disk drive.

16. The optical disk drive assembly of claim 11 wherein a first plurality of attachment features of the functional bezel matches a second plurality of attachment features.

17. The optical disk drive assembly of claim 11 wherein the disk guide facilitates proper attachment of the optical disk into the optical drive.

18. The optical disk drive assembly of claim 11 wherein the ramp feature is rigidly coupled to the functional bezel and wherein the ramp feature points the optical disk down into the optical drive during injection and points the optical disk up during ejection and wherein the cosmetic screen is disposed between the functional bezel and the cosmetic bezel.

19. The optical disk drive assembly of claim 11 wherein the cosmetic bezel includes a recess configured to receive the cosmetic screen.

20. The optical disk drive assembly of claim 11 wherein a second opening in the cosmetic bezel is larger than a first opening in the functional bezel to facilitate injection or ejection of the optical disk.

21. The optical disk drive assembly of claim 11 wherein the cosmetic screen performs at least one of minimizing contaminants into the optical disk drive and wiping the optical disk as the optical disk is being inserted into the optical disk drive.

22. A computer system comprising:
an enclosure;
an optical drive coupled to the enclosure;
a functional bezel having a first opening to receive an optical disk and a first attachment feature;
a cosmetic bezel having a second opening to receive the optical disk and second attachment feature, the cosmetic bezel rigidly coupled to the functional bezel through a coupling of the first and the second attachment features, wherein the first opening and the second opening are in alignment through the coupling of the first and the second attachment features;
a disk guide wherein the disk guide includes a ramp feature forming a lower surface of an opening having a ramp up toward an external side to point the optical disk downward into the optical drive during injection and to point the optical disk upward during ejection; and
a cosmetic screen disposed adjacent to the functional bezel and the cosmetic bezel and fixedly attached to one of the functional bezel and the cosmetic bezel,
wherein the cosmetic bezel is rigidly coupled to the functional bezel to form an integrated bezel assembly, the integrated bezel assembly coupled to the optical drive and the enclosure after the cosmetic bezel is rigidly coupled to the functional bezel to form the integrated bezel assembly
wherein the integrated bezel assembly is arranged such that the removal of the cosmetic bezel will also remove the functional bezel.

23. The computer system of claim 22 wherein the optical drive is rigidly mounted to the enclosure.

24. The computer system of claim 22 wherein the cosmetic bezel includes a recess configured to receive the cosmetic screen.

25. The computer system of claim 22 wherein the functional bezel provides structural rigidity for the optical drive.

26. The computer system of claim 22 wherein the functional bezel includes a plurality of mounting points for mounting the functional bezel to the optical drive.

27. The computer system of claim 22 wherein the first attachment feature of the functional bezel matches the second attachment feature.

28. The computer system of claim 22 wherein the disk guide facilitates proper attachment of the optical disk into the optical drive.

29. The computer system of claim 22 wherein the ramp feature is rigidly coupled to the functional bezel and wherein the ramp feature points the optical disk down into the optical drive during injection and points the optical disk up during ejection and wherein the cosmetic screen is disposed between the functional bezel and the cosmetic bezel.

30. The computer system of claim 22 wherein the second opening in the cosmetic bezel is larger than the first opening in the functional bezel to facilitate injection or ejection of the optical disk.

31. The computer system of claim 22 wherein the functional bezel facilitates slot loading of the optical disk into the optical drive.

* * * * *